Sept. 16, 1958 P. SPENCE 2,852,283
VALVE
Filed Feb. 12, 1954
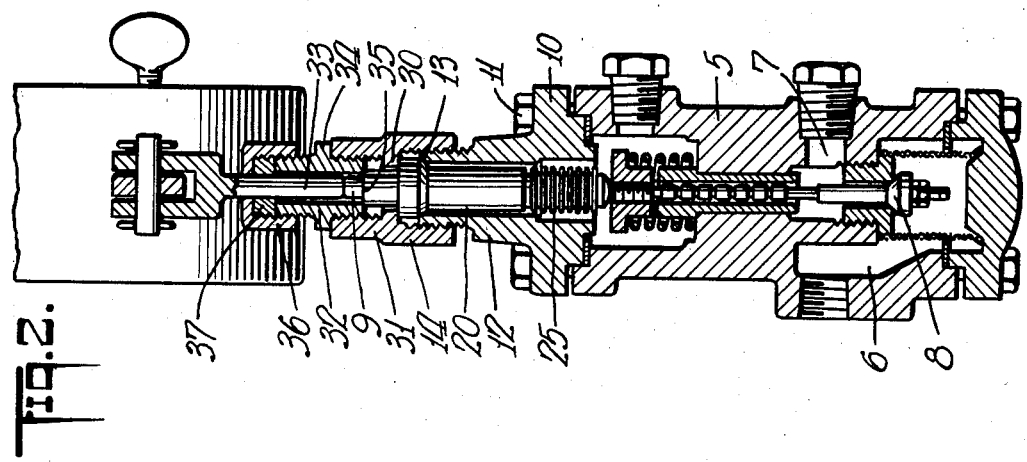
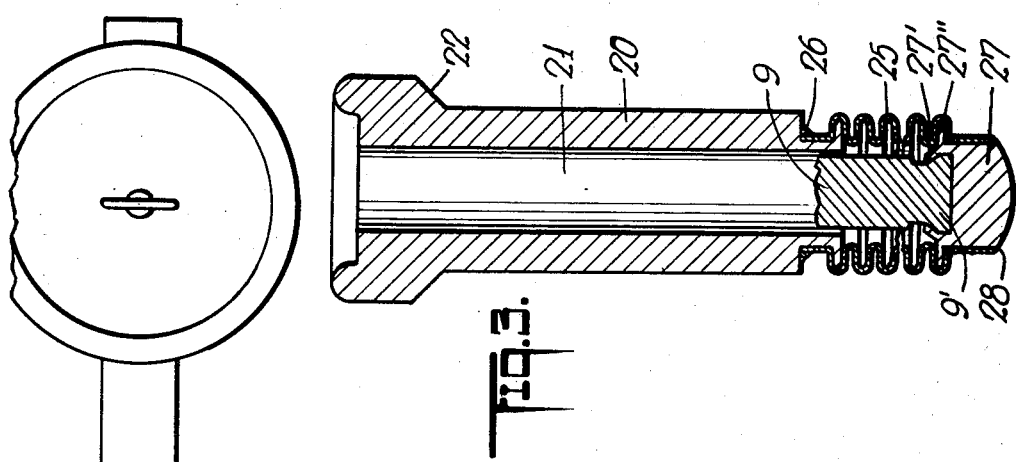
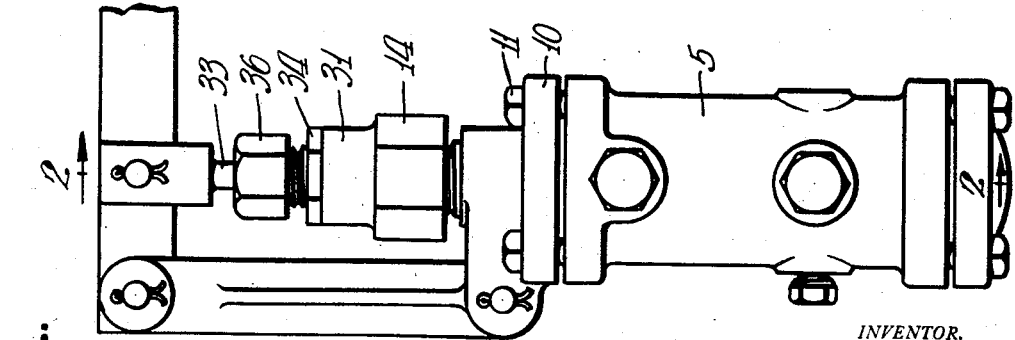
INVENTOR.
Paulsen Spence
ATTORNEYS

United States Patent Office 2,852,283
Patented Sept. 16, 1958

2,852,283
VALVE

Paulsen Spence, Baton Rouge, La.

Application February 12, 1954, Serial No. 409,976

2 Claims. (Cl. 286—1)

My invention relates to a bellows seal for valve stems and the like, and this application is a continuation-in-part of my application, Serial No. 300,555, filed July 23, 1952, now abandoned.

Ordinary stuffing boxes or packings for valve stems often leak if loose enough to permit relatively free sliding of the stem, and, if tight, so as to prevent leakage, they often offer such frictional resistance as to make delicate valve controls impossible. Furthermore, a closed bellows type of valve seal, which will permit free and unobstructed movement of the valve stem, is a source of trouble in case the bellows should rupture and thus permit steam or other liquid to escape past the stem.

It is an object of the invention to provide an improved bellows seal for valve stems and the like.

It is another object to provide improved means for packing a valve stem in a closed bellows seal, so as to prevent escape of fluid in case of rupture of the bellows or diaphragm seal.

Other objects and various features of invention will be hereinafter pointed out or will become apparent to those skilled in the art.

In the drawings which show, for illustrative purposes only, a preferred form of the invention:

Fig. 1 is a side view in elevation of a regulating valve illustrative of the invention;

Fig. 2 is a vertical sectional view, taken substantially in the plane of the line 2—2 of Fig. 1;

Fig. 3 is an enlarged, sectional view of a bellows seal used in the valve of Fig. 1.

In said drawings, I have illustrated a valve including a valve body 5, having an inlet side 6, and an outlet side 7. The passage of steam or other fluid through the valve is past the valve 8, which seats on a valve seat in the usual fashion. A valve stem 9, which may be in several sections, passes down through the valve body and is in position to engage the valve 8 through a bellows seal. The valve body in the form illustrated has a bonnet 10, held on the valve body as by means of screws or bolts 11. The valve stem 9, as will be clear, passes through the bonnet 10 and is enclosed in the bellows seal to be described. In the form illustrated, the bonnet has an upstanding sleeve part 12, having a generally conical seat 13 therein at the upper end. The outside of the sleeve 12 is threaded for the reception of an adapter nut 14.

The bellows or diaphragm seal, shown in detail in Fig. 3, comprises a sleeve 20 having a bore 21 therethrough for the free passage of the valve stem 9. The upper end of the sleeve 20 is enlarged and has a conical seating surface 22 to seat on the conical seat 13 of Fig. 1. A bellows type of seal 25 is secured to the sleeve 20 as by having the upper end spun or folded into a groove in the bottom of the sleeve and held therein as by means of solder or welding 26 or the like. The bottom end of the stem 9, or an extension thereof, is necked in and coned out or dovetailed, as indicated at 9', and a closure and valve actuator button 27 has an upstanding flange 27' to receive the coned head 9', and the flange 27' is spun or bent inwardly so as to embrace the coned head 9' to actuate the same and yet permit free rotation between the stem 9 and the button head 27. The button 27 has a radial flange 27'' on the bottom of the bellows 25, which embraces the radial flange 27'' and is held thereon as by means of solder or welding 28. Thus, the sleeve 20, the bellows 25, and the end closure or button 27 all form a hermetically sealed sleeve or receptacle for the reception of the valve stem 9, and the latter is freely rotatable in the receptable, and through the coned lower end is secured to the button 27 so that the valve stem is constrained to move with the button 27 and bellows. It will be seen, then, that during the operation of the valve, the stem 9 is moved up and down so as to cause or permit actuation of the valve, as will be clear.

With the adapter nut 14 having an inturned flange 30 engaging the top of the sleeve 20, the conical seat 22 is forced down into fluid-tight engagement with the top of the projection 12 on the bonnet, so that the outside of the sleeve and bellows will be hermetically sealed against leakage through the bonnet. Now, if the bellows 25 should rupture, steam or fluid could escape through the ruptured bellows up along the valve stem and to the exterior of the valve, with consequent annoyance and possible damage.

One feature of my invention is the provision of means for packing the valve so that even if the bellows or seal should rupture, steam will be prevented by the packing from escaping, or if the packing is not turned up tight, the steam need escape for only the time necessary to tighten up the packing.

In the form illustrated, the adapter nut 14 has an upward extension 31 internally threaded for the reception of a bushing 32. This bushing is of a size to receive an actuating stem 33, which could be stem 9, or a separate actuating stem engageable with the upper end of the stem 9. The bushing is normally screwed down until the flange 34 seats on the top of the adapter nut 14. The upper end of the valve stem 9 is preferably provided with a shoulder 35, which, upon maximum upward movement of the stem will engage the bottom of the bushing 32 and thus prevent straining of the bellows. The upper end of the bushing 32 is threaded for the reception of a packing nut 36 for holding packing 37 about the stem and against the top of the bushing 32. Thus, when the packing nut 36 is screwed up, the packing 37 will be compressed about the stem 33 so as to prevent leakage past the seal. Normally, the packing nut 36 may be left very loose so as not to compress the packing 37 to any extent, and thus the packing will offer little or no resistance to the easy passage of the stem 33 during normal actuation of the valve. In case the bellows should rupture, some steam or fluid might escape, but as soon as it is noticed, the packing nut could be screwed down, and thereafter there would be no leakage past the stem 33, and the valve could continue to function even though there would be some slight frictional resistance offered by the packing 37.

It will be seen, then, that I have provided a seal for a valve stem or the like which will offer practically no frictional resistance to the free actuation of the valve stem and yet which may be properly sealed or packed in case of breakage of the bellows or diaphragm, with consequent escape of fluid.

While the invention has been described in considerable detail and a preferred form illustrated, it is to be understood that various changes may be made within the scope of the invention as defined in the appended claims.

I claim:

1. In a valve of the character indicated, a valve body, a valve member having a valve stem projecting from said valve body, a bellows type seal in a part of said body, said bellows type seal comprising a sleeve member having a closed bellows hermetically sealed to the bottom thereof, said sleeve at the top having a tight fit with a seat on said body, a clamp nut on said body and clamping said sleeve in sealed relation with said seat on said body, said valve stem extending down in said bellows type seal and seating on the bottom thereof and projecting through the open top thereof and through said nut, a normally loose packing secured to said nut and extending about said projecting valve stem, and a second nut on and operable independently of said first mentioned nut and coacting with said packing to tighten the same on said valve stem to prevent leakage of fluid about the valve stem in case of rupture of said bellows type seal.

2. In a valve of the character indicated, a valve body, a valve member having a valve stem projecting from said valve body, a bellows-type seal in a part of said body, said bellows-type seal including a bellows hermetically closed at one end and open at the other end, first clamping means on said body and securing said open end in sealed relation with said body, said valve stem extending within said bellows-type seal and projecting through and beyond said open end thereof, a normally loose packing extending about the projecting part of said valve stem, and second clamping means referenced to said body and coacting with said packing to tighten the same on said valve stem to prevent leakage of fluid about said valve stem in case of rupture of said bellows-type seal.

References Cited in the file of this patent

UNITED STATES PATENTS

| | | |
|---|---|---|
| 848,009 | Castle | Mar. 26, 1907 |
| 1,289,434 | Fulton | Dec. 31, 1918 |
| 1,360,833 | Vuilleumier | Nov. 30, 1920 |
| 1,992,902 | McIntosh | Feb. 26, 1935 |
| 2,245,648 | Campbell | June 17, 1941 |
| 2,264,656 | Briscoe et al. | Dec. 2, 1941 |